United States Patent
Shimizu et al.

(10) Patent No.: US 11,879,519 B2
(45) Date of Patent: Jan. 23, 2024

(54) MAGNETORHEOLOGICAL FLUID

(71) Applicant: YAMASHITA RUBBER CO., LTD., Saitama (JP)

(72) Inventors: Hideyuki Shimizu, Saitama (JP); Taiki Koseki, Saitama (JP)

(73) Assignee: YAMASHITA RUBBER CO., LTD., Saitama (JP)

( * ) Notice: Subject to any disclaimer, the term of this patent is extended or adjusted under 35 U.S.C. 154(b) by 69 days.

(21) Appl. No.: 17/726,555

(22) Filed: Apr. 22, 2022

(65) Prior Publication Data

US 2023/0341024 A1    Oct. 26, 2023

(51) Int. Cl.
  *F16F 9/53* (2006.01)
  *F16F 9/00* (2006.01)

(52) U.S. Cl.
  CPC ........ *F16F 9/535* (2013.01); *F16F 2224/045* (2013.01)

(58) Field of Classification Search
  CPC .............................................. F16F 2224/045
  See application file for complete search history.

(56) References Cited

U.S. PATENT DOCUMENTS

| | | | |
|---|---|---|---|
| 6,068,249 A * | 5/2000 | Shtarkman | F16F 9/535 267/140.14 |
| 6,395,193 B1 | 5/2002 | Kintz et al. | |
| 2003/0071238 A1 | 4/2003 | Kintz et al. | |
| 2004/0140447 A1 | 7/2004 | Kintz et al. | |

FOREIGN PATENT DOCUMENTS

| | | | | |
|---|---|---|---|---|
| DE | 112016007083 T5 * | 4/2019 | | H01F 1/28 |
| EP | 1219852 A1 * | 7/2002 | | C10M 171/001 |
| JP | 2004510020 A * | 4/2004 | | |
| JP | 2006505937 | 2/2006 | | |
| JP | 6682608 B1 * | 4/2020 | | F16F 9/53 |

* cited by examiner

*Primary Examiner* — Melody M Burch
(74) *Attorney, Agent, or Firm* — JCIPRNET

(57) ABSTRACT

A magnetorheological fluid with balanced viscosity and sedimentation properties includes: a magnetic material; a medium to allow the magnetic material to be dispersed therein; a dispersant to disperse the magnetic material within the medium while forming a magnetic material holding structure to hold the magnetic material; and a reinforcing agent to reinforce the magnetic material holding structure. An amount of the magnetic material is 25 wt % to 75 wt % relative to a sum of the medium and the magnetic material. An amount of the medium is 25 wt % to 75 wt % relative to the sum of the medium and the magnetic material. An amount of the dispersant is 0.5 wt % to 6 wt % relative to the sum of the medium and the magnetic material. An amount of the reinforcing agent is 5 wt % to 300 wt % relative to a weight of the dispersant.

5 Claims, No Drawings

MAGNETORHEOLOGICAL FLUID

BACKGROUND

Technical Field

The present invention relates to a magnetorheological fluid.

Related Art

A magnetorheological (MR) fluid contains magnetic particles, such as iron or magnetite, dispersed in a certain dispersion medium (e.g., see Patent Document 1). Because the magnetorheological fluid can be controlled with respect to its rheological and mechanical properties, this material finds its main use as direct-acting devices such as mounting devices and shock absorbers for automobiles, seat dampers for construction machines, etc.

CITATION LIST

Patent Literature
Patent Document 1: Japanese Unexamined Patent Application Publication (Translation of PCT Application) No. 2006-505937

SUMMARY

The magnetorheological fluid has a drawback in that, when left to stand, its magnetic particles may settle and agglomerate. In such cases, a technique of adding a thixotropic agent is employed to provide high viscosity to the medium and thereby reduce a sedimentation rate of the magnetic particles. Providing thixotropy to the magnetorheological fluid reduces the sedimentation of the magnetic particles on standing, while allowing the magnetorheological fluid to exhibit properties as a magnetic fluid through reduction of a dynamic viscosity.

However, increasing a static viscosity of the magnetorheological fluid to fully reduce the sedimentation of the magnetic particles will involve handling difficulties. Additionally, the dynamic viscosity will also increase, making it hard to ensure properties as a magnetorheological fluid.

It is an object of certain embodiments of the present invention to provide a magnetorheological fluid with balanced viscosity and sedimentation properties.

Certain embodiments of the present embodiment provide a magnetorheological fluid including: a magnetic material; a medium to allow the magnetic material to be dispersed therein; a dispersant to disperse the magnetic material within the medium while forming a magnetic material holding structure to hold the magnetic material; and a reinforcing agent to reinforce the magnetic material holding structure. An amount of the magnetic material is 25 wt % to 75 wt % relative to a sum of the medium and the magnetic material. An amount of the medium is 25 wt % to 75 wt % relative to the sum of the medium and the magnetic material. An amount of the dispersant is 0.5 wt % to 6 wt % relative to the sum of the medium and the magnetic material. An amount of the reinforcing agent is 5 wt % to 300 wt % relative to a weight of the dispersant.

Preferably, the dispersant may include a rheology control agent.

Still preferably, the dispersant may include silica, and the magnetic material holding structure may have a network structure.

Preferably, the silica may have a primary particle size of greater than 10 nm.

Preferably, the silica may be wet-process silica.

Preferably, the wet-process silica may have a secondary particle size of smaller than 2.5 μm.

Preferably, the reinforcing agent may be selected from polyhydroxycarboxylic acid derivatives.

Still preferably, the polyhydroxycarboxylic acid derivatives may include polyhydroxycarboxylic acid amides or polyhydroxycarboxylic acid esters.

Certain embodiments of the present invention provide a magnetorheological fluid with balanced viscosity and sedimentation properties.

DETAILED DESCRIPTION

An exemplary embodiment (hereinafter referred to as a "present embodiment") of the present invention is described below. It should be noted that the present invention is not limited to the present embodiment given below and is susceptible to various modifications within its scope.

(Medium)

In the present embodiment, a medium for the magnetorheological fluid may be mineral oil, vegetable oil, glycol-based liquid, silicone oil, water, etc. Specific examples include poly-α-olefin, rapeseed ester oil, hydrocarbon oil, ethylene glycol, propylene glycol, isoparaffin, alkylnaphthalene, fluorine oil, and perfluoroether. These are used alone or mixed in various combinations.

In the present embodiment, a mixed medium consisting of ethylene glycol, propylene glycol, and water is used as the medium.

In the present embodiment, the amount of the medium in the magnetorheological fluid is typically 25 wt % to 75 wt %, preferably 30 wt % to 50 wt %, relative to a sum of the medium and the magnetic material. Too little medium in the magnetorheological fluid will disadvantageously tend to significantly increase the viscosity and reduce the fluidity of the magnetorheological fluid itself. Too much medium in the composition will disadvantageously reduce a relative amount of the magnetic material and tend to result in a failure to achieve sufficient viscosity change and shear stress upon application of a magnetic field.

(Magnetic Material)

In the present embodiment, a paramagnetic compound, a superparamagnetic compound, or a ferromagnetic compound is used as the magnetic material. Specific examples include iron, iron alloys, iron oxides, iron nitrides, iron carbides, chromium dioxides, low-carbon steel, silicon steel, nickel, cobalt, and mixtures thereof. Iron oxides include pure iron oxides and oxides containing a small amount of manganese, zinc, barium, etc. Further examples include hydrophilically surface-treated iron powder (such as carbonyl iron powder), iron formed with a surface oxide film (hard grade), iron with a surface oxide film removed (soft grade), magnetite, manganese-zinc ferrite, etc. Alloys containing aluminum, silicon, cobalt, nickel, vanadium, molybdenum, chromium, tungsten, manganese, copper, etc. may also be used. Depending on the solvent used, hydrophobic treatment may be applied to surfaces of these materials.

The particle size of the magnetic material is typically 0.5 μm to 50 μm, preferably 1 μm to 20 μm. Too small particle size of the magnetic material will disadvantageously tend to result in a failure to achieve sufficient shear stress upon application of an external magnetic field. Too large particle size of the magnetic material will disadvantageously tend to cause easy sedimentation of the magnetic particles and cause increased friction during sliding.

In the present embodiment, the amount of the magnetic material in the magnetorheological fluid is typically 25 wt % to 75 wt %, preferably 50 wt % to 70 wt %, relative to the sum of the medium and the magnetic material. Too little magnetic material in the magnetorheological fluid will disadvantageously tend to result in a failure to increase the kinematic viscosity under application of a magnetic field, significantly diminishing the performance as a magnetorheological fluid. Too much the magnetic material in the magnetorheological fluid will disadvantageously tend to make the fluid clayish and significantly diminish the characteristic fluidity of the magnetorheological fluid.

(Dispersant)

The dispersant used in the present embodiment is a substance that disperses the magnetic material into the medium while wrapping around the magnetic material like a net and also forms a network in the medium. Namely, the dispersant disperses the magnetic material within the medium while forming a magnetic material holding structure to hold the magnetic material. The magnetic material holding structure has a network structure. The magnetic material holding structure has a network structure. Examples of such a substance include thickeners that increase the viscosity of the composition through addition of rheology control agents, polymeric thickeners, polysaccharide thickeners, etc., and surfactants adsorbed on magnetic particles including nonionic surfactants, amphoteric surfactants, polymeric surfactants, pigment dispersants, fatty acids, amines, amides, imides, metallic soaps, fatty acid oligomer compounds, silane coupling agents, titanate coupling agents, and aluminate coupling agents.

Among others, rheology control agents are preferred as additives that impart rheological properties to the magnetorheological fluid such that shear viscosity of the magnetorheological fluid is increased in a low shear rate range and reduced in a high shear rate range. Examples of rheology control agents include inorganic compound-based rheology control agents such as silica (e.g., wet-process silica, dry-process silica, gelled silica) and clay, and organic compound-based rheology control agents such as urea-modified polymers, urethane-modified polymers, castor oil waxes, polyethylene waxes, polyamide waxes, fatty acid amide waxes, fibrous polymer compounds, and cellulose nanofibers (CNF). These rheology control agents may be used alone or in a combination of two or more of these agents.

In the present embodiment, for example when wet-process silica is used as the rheology control agent, a primary particle size of the wet-process silica is typically 3 nm or greater, and a secondary particle size thereof is typically 20 μm or less. In the case of using dry-process silica, a primary particle size of the dry-process silica is typically 7 nm or greater. Too small silica particle size will disadvantageously tend to cause silica particles to be agglomerated to form an agglomerate. Too large silica particle size will disadvantageously tend to increase the interstices of the three-dimensional network structure formed by the silica and thus reduce the holding effect.

In the present embodiment, the amount of the dispersant in the magnetorheological fluid is typically 0.5 wt % to 6 wt %, preferably 2 wt % to 6 wt %, relative to the sum of the medium and the magnetic material. Too little dispersant in the magnetorheological fluid will disadvantageously tend to result in a failure to form a network structure sufficient to hold the magnetic material, diminishing the resistance to sedimentation. Too much dispersant in the magnetorheological fluid will disadvantageously tend to diminish fluid degassing and handling efficiency due to increased viscosity of the magnetorheological fluid.

(Reinforcing Agent)

In the present embodiment, a reinforcing agent is mixed to reinforce the magnetic material holding structure in the medium formed by the aforementioned dispersant to wrap around the magnetic material. This inhibits agglomeration of the magnetic material and reduces sedimentation of the magnetic material. Examples of the reinforcing agent include polyhydroxycarboxylic acid derivatives. Specific example compounds of the polyhydroxycarboxylic acid derivatives include polyhydroxycarboxylic acid amides and polyhydroxycarboxylic acid esters.

In the present embodiment, the amount of the reinforcing agent in the magnetorheological fluid is typically 5 wt % to 300 wt %, preferably 10 wt % to 200 wt %, relative to the weight of the dispersant. Too little reinforcing agent in the magnetorheological fluid will disadvantageously tend to result in a failure to provide a satisfactory reinforcing effect for the structure formed by the dispersant, diminishing the sedimentation resistance of the magnetic material. Too much reinforcing agent in the magnetorheological fluid will disadvantageously tend to result in a failure to provide a satisfactory reinforcing effect for the structure formed by the dispersant due to self-association of the reinforcing agent, diminishing the sedimentation resistance of the magnetic material.

In addition to the above components, other additives such as anti-abrasion agents, extreme pressure agents, rust inhibitors, friction modifiers, solid lubricants, antioxidants, defoamers, colorants, and viscosity modifiers may be mixed in the magnetorheological fluid of the present embodiment when necessary. In such cases, these additives may be used alone or in a combination of two or more.

EXAMPLES

The present invention is further discussed below based on Examples. It should be noted that the present invention is not limited to Examples below. Unless specifically indicated otherwise, parts and percentages in Examples and Comparative Examples below are all given by weight.

(1) Preparation of Magnetorheological Fluids

Magnetorheological fluids with compositions shown in Table 1 were prepared.

First, a dispersant and a reinforcing agent are added and stirred into the medium. Then, the magnetic material is added and stirred into the medium. Upon stopping the stirring, binding of the dispersant and the reinforcing agent forms a network structure, increasing the viscosity. As a result, the magnetic material is held in a magnetic material holding structure formed by interstices of the network structure. Then, when a shearing force is applied to the solution again, the network structure collapses, reducing the viscosity.

It should be noted that the method for manufacturing the magnetorheological fluid according to the present embodiment is not particularly limited; the magnetorheological fluid can be prepared by mixing the medium, the magnetic material, the dispersant, the reinforcing agent, and other additives (when necessary) in any order.

(2) Magnetorheological Fluid Testing (a) Sedimentation Test

Each magnetorheological fluid was conditioned in a sample bottle (with a capacity of 24 ml) and left to stand at 23° C. After 1000 hours, the height from the fluid surface to the interface where the medium (supernatant) and the magnetic material mixture (sedimentation component) are separated (separation volume [mm]) relative to the total fluid height of the magnetorheological fluid (total fluid volume [mm]) was measured to evaluate the dispersion stability based on the following formula: sedimentation rate [%]= (separation volume [mm]/total fluid volume [mm])×100. A smaller value of the sedimentation rate [%] means better resistance to sedimentation.

(b) Kinematic Viscosity Measurement

Using a Brookfield type viscometer, each magnetorheological fluid in the sample bottle was measured at 25° C. with respect to its kinematic viscosities (cSt) under application of a magnetic field (with magnetic field) using a magnetic base available from KANETEC CO., LTD. (model: MB-T3) and in the absence of application of a magnetic field (without magnetic field). A smaller measured value means a lower viscosity.

(c) Magnetic Field Properties

A ratio (kinematic viscosity ratio:ON/OFF ratio) between the kinematic viscosity under application of a magnetic field (ON) and the kinematic viscosity in the absence of application of a magnetic field (OFF) was obtained as a measure of magnetic field properties as a magnetorheological fluid. Magnetorheological fluids with a larger kinematic viscosity ratio (ON/OFF ratio) can be said to be more useful and have wider applications.

Examples 1-10 and Comparative Examples 1-5

Magnetorheological fluids shown in Tables 1 and 2 were measured with respect to their sedimentation properties, kinematic viscosities, and shear stresses (Examples 1-10). For comparison, compositions shown in Table 3 were prepared and measured with respect to their sedimentation properties and kinematic viscosities under the same conditions as Example 1 (Comparative Examples 1-5). The results are shown in Tables 1-3. The amount of each reinforcing agent in Tables 1-3 is given as concentration (wt %) relative to the dispersant mixed in the magnetorheological fluid. Sources for the magnetorheological fluid components used in these Examples and Comparative Examples are listed below Table 2.

TABLE 1

| | Examples | | | | |
|---|---|---|---|---|---|
| | 1 | 2 | 3 | 4 | 5 |
| Ethylene glycol-based solvent | | | | | |
| (wt % relative to sum of solvent and iron powder) | 39 | 39 | 39 | 39 | 39 |
| Magnetic material (wt % relative to sum of solvent and iron powder) | | | | | |
| Carbonyl iron powder 1 | 61 | 61 | 61 | 61 | 61 |
| Carbonyl iron powder 2 | — | — | — | — | — |
| Dispersant (wt % relative to sum of solvent and iron powder) | | | | | |
| (Silica) Silica 1 | — | — | — | 2 | — |
| Silica 2 | 1 | 1 | 2 | — | — |
| Silica 3 | — | — | — | — | 2 |
| Silica 4 | — | — | — | — | — |
| Reinforcing agent (wt % relative to dispersant) | | | | | |
| Polyhydroxycarboxylic acid amide derivative | 25 | — | 26 | 26 | 26 |

TABLE 1-continued

| | Examples | | | | |
|---|---|---|---|---|---|
| | 1 | 2 | 3 | 4 | 5 |
| Polyhydroxycarboxylic acid ester derivative | — | 11 | — | — | — |
| Testing results | | | | | |
| Sedimentation rate (%) (23° C., after 1000 hrs.) | 41 | 45 | 26 | 30 | 13 |
| Kinematic viscosity [cSt] | | | | | |
| Without magnetic field | 937 | 335 | 995 | 551 | 1957 |
| With magnetic field | 17047 | 11539 | 19361 | 6661 | 20960 |
| Kinematic viscosity ratio (ON/OFF) | 18 | 34 | 19 | 12 | 11 |

TABLE 2

| | Examples | | | | |
|---|---|---|---|---|---|
| | 6 | 7 | 8 | 9 | 10 |
| Ethylene glycol-based solvent | | | | | |
| (wt % relative to sum of solvent and iron powder) | 39 | 39 | 39 | 39 | 39 |
| Magnetic material (wt % relative to sum of solvent and iron powder) | | | | | |
| Carbonyl iron powder 1 | 61 | 61 | 61 | — | 61 |
| Carbonyl iron powder 2 | — | — | — | 61 | — |
| Dispersant (wt % relative to sum of solvent and iron powder) | | | | | |
| (Silica) Silica 1 | — | — | — | — | — |
| Silica 2 | — | — | — | — | — |
| Silica 3 | 2 | 2 | 2 | 2 | — |
| Silica 4 | — | — | — | — | 2 |
| Reinforcing agent (wt % relative to dispersant) | | | | | |
| Polyhydroxycarboxylic acid amide derivative | 100 | 266 | 160 | 26 | 26 |
| Polyhydroxycarboxylic acid ester derivative | — | — | — | — | — |
| Testing results | | | | | |
| Sedimentation rate (%) (23° C., after 1000 hrs.) | 4 | 50 | 13 | 22 | 38 |
| Kinematic viscosity [cSt] | | | | | |
| Without magnetic field | 1849 | 433 | 1698 | 779 | 822 |
| With magnetic field | 15183 | 7625 | 15337 | 13990 | 16959 |
| Kinematic viscosity ratio (ON/OFF) | 8 | 18 | 9 | 18 | 21 |

(Medium)

Ethylene glycol-based solvent: available from CCi Corporation.

(Magnetic Material)

Carbonyl iron powder 1: MRF-35 available from Jiangsu Tianyi Ultra-Fine Metal Powder Co., Ltd (particle size: 2.5 microns)

Carbonyl iron powder 2: YMIM-73 available from Jiangsu Tianyi Ultra-Fine Metal Powder Co., Ltd (particle size: 5.0 microns)

(Dispersant)

Silica 1: Nipsil CX-200 available from Tosoh Corporation (primary particle size: 4 nm; secondary particle size: 1.7 μm)

Silica 2: Nipsil E-200A available from Tosoh Corporation (primary particle size: 20 nm; secondary particle size: 2.5-3.5 μm)

Silica 3: Nipsil SP-200 available from Tosoh Corporation (primary particle size: 15 nm; secondary particle size: 1-2 μm)

Silica 4: Nipsil VN3 available from Tosoh Corporation (primary particle size: 15 nm; secondary particle size: 18 μm or greater)
(Reinforcing Agent)
Polyhydroxycarboxylic acid amide derivative: RHEOBKY-7405 available from BYK-Chemie GmbH (solution of polypropylene glycol 600 of polyhydroxycarboxylic acid amides; 52% concentration)
Polyhydroxycarboxylic acid ester derivative: RHEOBKY-606 available from BYK-Chemie GmbH (polyhydroxycarboxylic acid esters alone)

TABLE 3

| | Comparative Examples | | | | |
|---|---|---|---|---|---|
| | 1 | 2 | 3 | 4 | 5 |
| Ethylene glycol-based solvent | | | | | |
| (wt % relative to sum of solvent and iron powder) | 39 | 39 | 39 | 80 | 20 |
| Magnetic material (wt % relative to sum of solvent and iron powder) | | | | | |
| Carbonyl iron powder 1 | 61 | 61 | 61 | 20 | 80 |
| Dispersant (wt % relative to sum of solvent and iron powder) | | | | | |
| (Silica) Silica 3 | — | 2 | 8 | 2 | 2 |
| Reinforcing agent (wt % relative to dispersant) | | | | | |
| Polyhydroxycarboxylic acid amide derivative | — | — | 7 | 26 | 26 |
| Testing results | | | | | |
| Sedimentation rate (%) (23° C., after 1000 hrs.) | 65 | 57 | — | 60 | — |
| Kinematic viscosity [cSt] | | | | | |
| Without magnetic field | 162 | 389 | N/A | 33 | N/A |
| With magnetic field | 5915 | 7926 | N/A | 959 | N/A |
| Kinematic viscosity ratio (ON/OFF) | 36 | 20 | — | 29 | — |

The results shown in Tables 1 and 2 indicate that the magnetorheological fluid according to the present embodiment (each of Examples 1-10) has reduced sedimentation and agglomeration properties for the magnetic material contained in the magnetorheological fluid and possesses a good balance between viscosity and sedimentation properties.

In contrast, it can be seen that when no reinforcing agent (polyhydroxycarboxylic acid derivative) is mixed (Comparative Examples 1 and 2), the sedimentation properties of the magnetic material do not improve. It can be seen that when the amount of the dispersant (silica) is too large (8 wt %) (Comparative Example 3), the fluid becomes clayish, making it difficult to perform kinematic viscosity measurement. It can be seen that when the amount of the magnetic material (carbonyl iron powder) is too small (20 wt %) (Comparative Example 4), albeit the kinematic viscosity ratio (ON/OFF ratio) being 29, the kinematic viscosities of the magnetorheological fluid without and with application of a magnetic field are small, which is indicative of poor performance as a magnetorheological fluid. It can be seen that when the amount of the magnetic material (carbonyl iron powder) is too large (80 wt %) (Comparative Example 5), the fluid becomes clayish, making it difficult to perform kinematic viscosity measurement.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art without departing from the scope and sprit of the present invention. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. A magnetorheological fluid comprising:
    a magnetic material;
    a medium to allow the magnetic material to be dispersed therein;
    a dispersant to disperse the magnetic material within the medium while forming a magnetic material holding structure to hold the magnetic material; and
    a reinforcing agent to reinforce the magnetic material holding structure, wherein
    an amount of the magnetic material is 25 wt % to 75 wt % relative to a sum of the medium and the magnetic material,
    an amount of the medium is 25 wt % to 75 wt % relative to the sum of the medium and the magnetic material,
    an amount of the dispersant is 0.5 wt % to 6 wt % relative to the sum of the medium and the magnetic material, and
    an amount of the reinforcing agent is 5 wt % to 300 wt % relative to a weight of the dispersant,
    wherein the dispersant comprises a rheology control agent,
    wherein the dispersant comprises silica,
    wherein the magnetic material holding structure has a network structure, and
    wherein the silica has a primary particle size of greater than 10 nm.
2. The magnetorheological fluid according to claim 1, wherein the silica is wet-process silica.
3. The magnetorheological fluid according to claim 2, wherein the wet-process silica has a secondary particle size of smaller than 2.5 μm.
4. The magnetorheological fluid according to claim 1, wherein the reinforcing agent is selected from polyhydroxycarboxylic acid derivatives.
5. The magnetorheological fluid according to claim 4, wherein the polyhydroxycarboxylic acid derivatives comprise polyhydroxycarboxylic acid amides or polyhydroxycarboxylic acid esters.

* * * * *